(12) United States Patent
Verhaeghe et al.

(10) Patent No.: US 6,384,622 B2
(45) Date of Patent: May 7, 2002

(54) DEVICE FOR CANCELLING THE REFLECTION EFFECTS BETWEEN A DRIVER AND A PLURALITY OF RECEIVERS

(75) Inventors: Michel Verhaeghe, Vence; Christian Ouazana, StLaurent du Var; Patrick Michel, La Gaude; Bernard Sergent, Vence, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/795,628

(22) Filed: Feb. 28, 2001

(30) Foreign Application Priority Data

Feb. 29, 2000 (EP) .............................................. 00480025

(51) Int. Cl.$^7$ .............................................. H03K 17/16
(52) U.S. Cl. .............................. 326/30; 326/86; 326/93
(58) Field of Search .............................. 326/30, 82, 93, 326/86

(56) References Cited

U.S. PATENT DOCUMENTS 5,521,536 A * 5/1996 Yamashita et al. ............ 326/82
5,583,449 A * 12/1996 Buuck et al. .................. 326/30

* cited by examiner

Primary Examiner—Michael Tokar
Assistant Examiner—Anh Q. Tran
(74) Attorney, Agent, or Firm—Eric W. Petraske

(57) ABSTRACT

Device for cancelling the effects of the reflection in a signal transmission system (10) including a driver (12) and a plurality of n receivers (14, 16) wherein signals are sent according to a multipoint topology from the driver to the receivers, each receiver having an internal capacitance and sending back reflection signals to the driver each time a signal is transmitted thereto by the driver. The device comprises circuit means causing the signal resulting from the sequential reflections due to a given receiver and then due to the driver to have the same magnitude but the reverse sign as the sum of all signals received in the given receiver resulting from the reflections due to all receivers, and the net linking the driver to each receiver comprises delay means (40) enabling the propagating time of a signal sent from the driver to this receiver to be identical for each receiver, whereby the total sum of all reflection signals arriving in the given receiver at the same time is equal to zero.

9 Claims, 3 Drawing Sheets

DEVICE FOR CANCELLING THE REFLECTION EFFECTS BETWEEN A DRIVER AND A PLURALITY OF RECEIVERS

TECHNICAL FIELD

The invention relates to the transmission of data signals from a driver to one or several receivers on an electronic card used in a data processing device and relates in particular to a device enabling the reflection effects between a driver and the receivers of the card to be canceled.

BACKGROUND OF THE INVENTION

Electronic cards are used in the devices of a data transmission network for transmitting high speed signals. Such cards can include a plurality of drivers each of them being connected by a net to one or several receivers. Accordingly, each net includes three parts: the driver characterized by its output impedance equivalent to a resistance, the transmission medium characterized by its characteristic impedance, its propagation delay and its topology (point to point, multipoint daisy chain or multipoint star) and the receiver characterized by its input impedance equivalent to a capacitance.

The problem to be solved with networks between the driver and the receivers is to obtain a high signal integrity at each receiver input level, and therefore to suppress as much as possible the reflections between the driver and each receiver. Unfortunately, the cards are designed in taking into account dimensional constraints imposing the floor planning of the components inside the card. Therefore, it is not possible to place the receivers anywhere on the card, and in particular, it is not possible to group them. Such constraints result in an optimization in the choice of the best topology to be used.

For critical high speed nets, only point to point topologies with a terminating resistance enable to solve the problem by introducing a resistance at the output of the driver such that the total output resistance is equal to the characteristic impedance of the net and to add a terminating resistance having a value equal to the characteristic impedance of the net.

But, in order to reduce the total number of components on the card, a single driver should be able to drive several receivers with the following requirements, fastest propagation delay through the transmission medium, fastest transition time across the threshold region of the receiver, no glitch allowed in the threshold region of the receiver and limited overshoot/undershoot outside the threshold region. To meet these requirements, the terminated multipoint star is to be avoided insofar as a resistance terminating each receiver would result in a very important energy consumption for the driver device.

The best way would be to use a terminated multipoint daisy chain. But such a solution consisting in using a terminating resistance the value of which is equal to the characteristic impedance of the net, results always in an important energy consumption and there are remaining reflections with the high speed signals caused by the parasitic input capacitance of the receiver.

SUMMARY OF THE INVENTION

Accordingly, the object of the invention is to provide a device for cancelling the effects of the reflections in a multipoint topology wherein a driver transmits high speed data signals to a plurality of receivers.

The invention relates therefore to a device for cancelling the effects of the reflection in a signal transmission system including a driver and a plurality of n receivers wherein signals are sent according to a multipoint topology from the driver to the receivers, each receiver having an internal capacitance and sending back reflection signals to the driver each time a signal is transmitted thereto by the driver. The device comprises circuit means causing the signal resulting from the sequential reflections due to a given receiver and then due to the driver to have the same magnitude but the reverse sign as the sum of all signals received in the given receiver resulting from the reflections due to all receivers, and the net linking the driver to each receiver comprises delay means enabling the propagating time of a signal sent from the driver to this receiver to be identical for each receiver, whereby the total sum of all reflection signals arriving in the given receiver at the same time is equal to zero.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
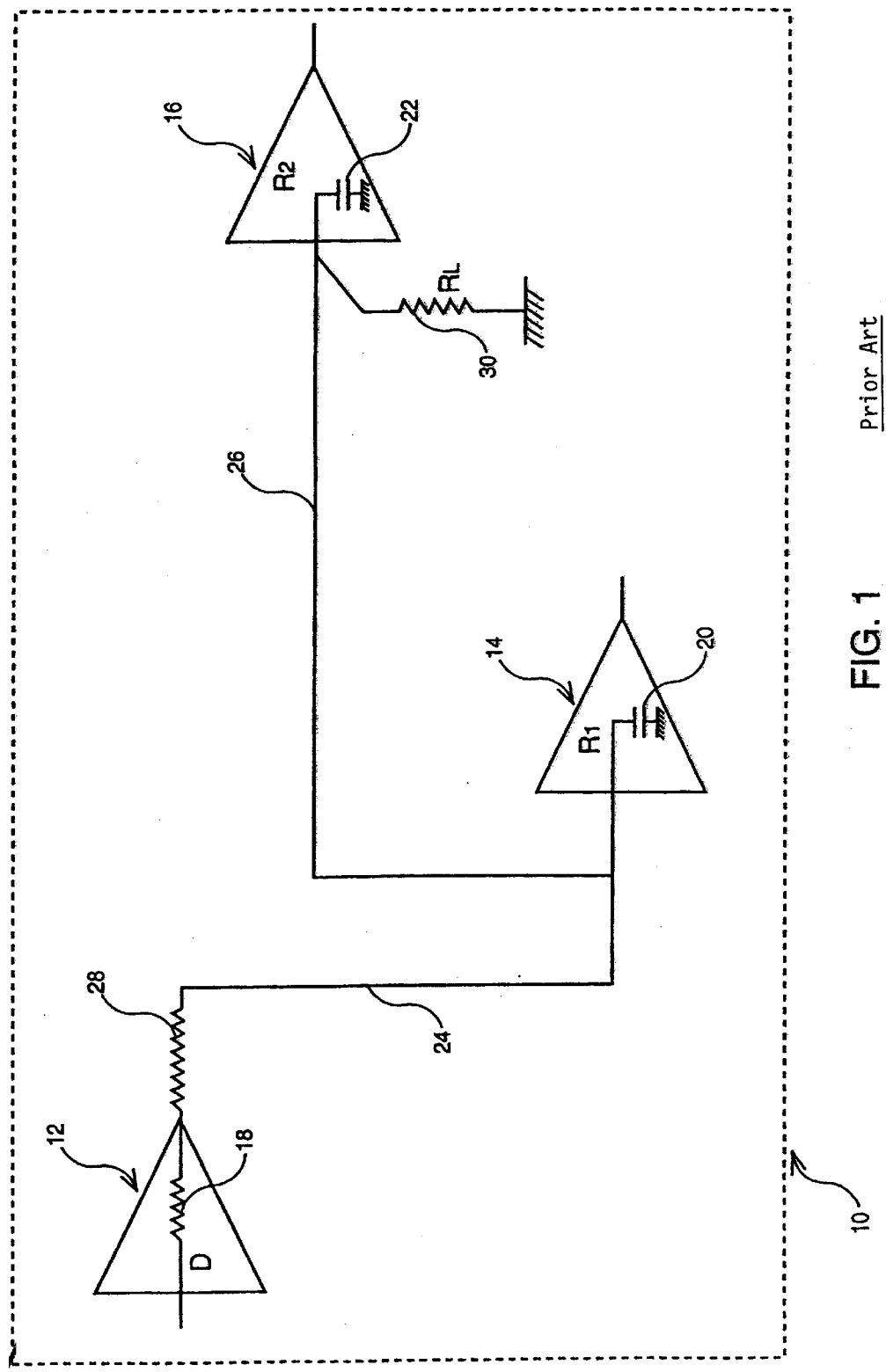
FIG. 1 represents a block-diagram of a card including a driver and two receivers and wherein the standard solution of a terminating resistance is used to solve the reflection problem.

In reference to FIG. 1, a card 10 includes a driver (D) 12 transmitting data pulses to receiver (R1) 14 and receiver (R2) 16. Driver 12 is characterized by its output resistance 18 having a value $R_{OUT}$, receiver 14 is characterized by its internal capacitance 20 having a value $C_{R1}$ and receiver 16 is characterized by its internal capacitance 22 having a value $C_{R2}$. It is admitted that the transmission medium 24 connecting driver 12 to receiver 14 has a characteristic impedance $Z_0$ and the transmission medium 26 connecting receiver 14 to receiver 16 has also a characteristic impedance $Z_0$. For better signal integrity, a resistance 28 is connected at the output of driver 12, and having a value so that the sum of resistance 28 and the resistance 18 is equal to $Z_0$. It is easily checked that the signal integrity is optimum when the internal capacitances $C_{R1}$ and $C_{R2}$ of the receivers are not taken into account, thanks to the terminating $R_L$ equal to $Z_0$. But, for high slew rate signals transmitted from the driver to the receivers, this assumption of internal capacitance not affecting the signals is false. Thus, for a signal having a rise time of 0.35 ns, an internal capacitance of 3 pF has an impedance of approximately 50 Ω, same range of magnitude as the terminating resistance. This means that a high slew rate signal produces reflections when reaching a parallel association of 3 pF capacitance and a $Z_0$ characteristic impedance. A first reflection occurs when the incident signal reaches receiver R1 due to the impedance mismatch resulting from its internal capacitance $C_{R1}$.

Another reflection occurs when the incident signal reaches receiver R2 due to the presence of internal capacitance $C_{R2}$ in parallel with resistance $R_L$. The termination is therefore no longer adapted to $Z_0$, and reflected signal is transmitted back to receiver R1.

Finally, at a time which is two times the trip delay between the receivers R1 and R2 after the incident signal has reached R1, a negative pulse is added to the incident signal at R1. Signal integrity is no longer guaranteed since a dip appears some time during or after the rising transition on R1.

Figure 2:
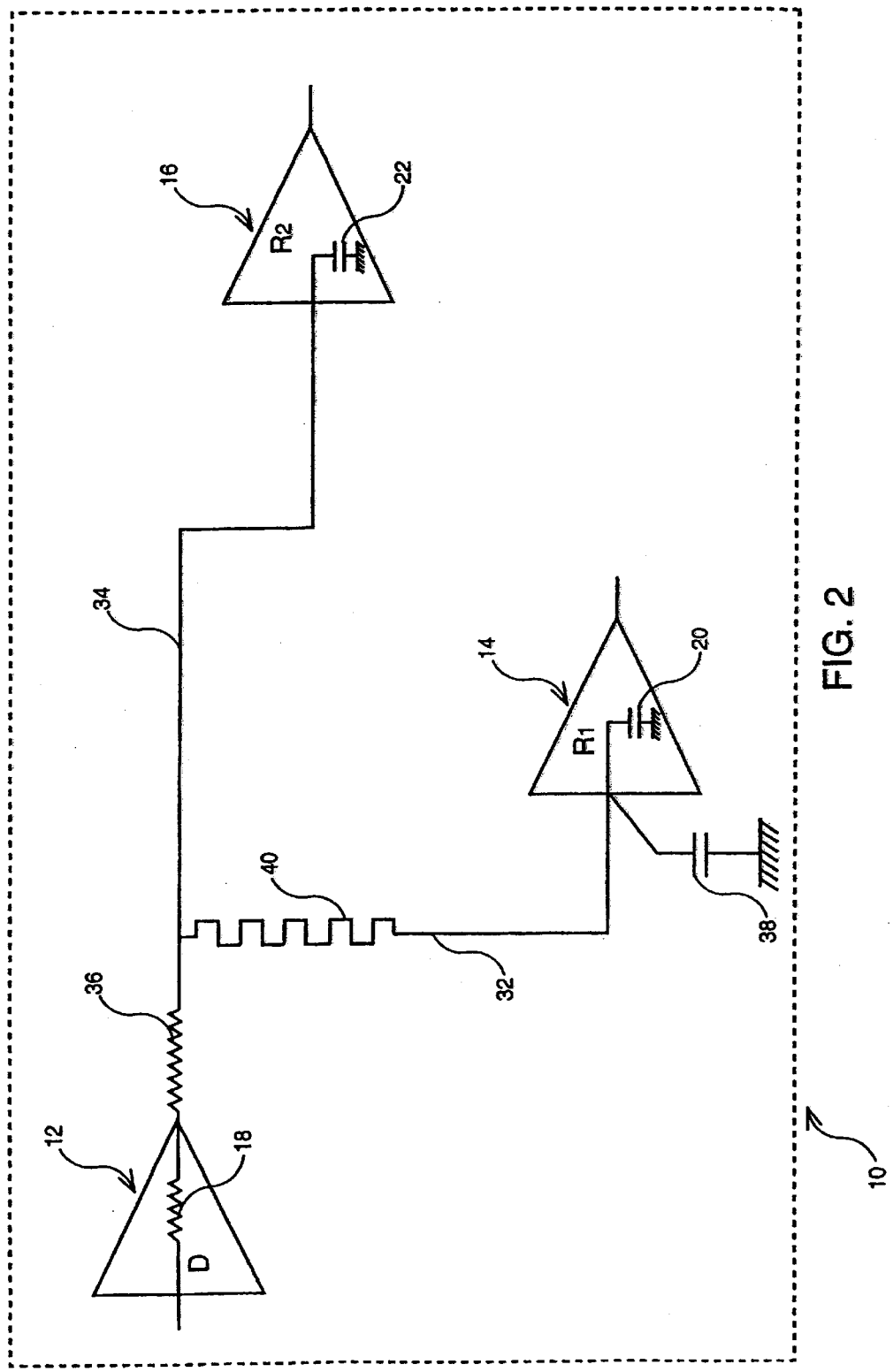
FIG. 2 represents a block diagram of a card including a driver and two receivers and wherein the device according to the invention is used to cancel the effects of the reflections.

Surprisingly, the solution to the above problem is not to cancel the reflections but to cancel the effects of the reflections. This solution which is the object of the invention, is described in reference to FIG. 2 representing the card 10 with the same components as in FIG. 1, that is driver (D) 12 with its resistance 18, receiver (R1) 14 with its internal capacitance 20 and receiver (R2) 16 with its internal capacitance 22.

But, differently from the assembly illustrated in FIG. 1, the connections between the driver and the two receivers are not according to a daisy chain topology but according to a multipoint star assembly. Transmission medium 32 to receiver 14 and transmission medium 34 to receiver 16 are both connected at the output of the driver 12 by the intermediary of a resistance the value of which is defined as explained below.

For purposes of the claims, the term "transmission medium" will be taken in a very general sense, including a conductive strip on a printed circuit board, a wire, a coaxial cable, or an RF waveguide.

Figure 3:
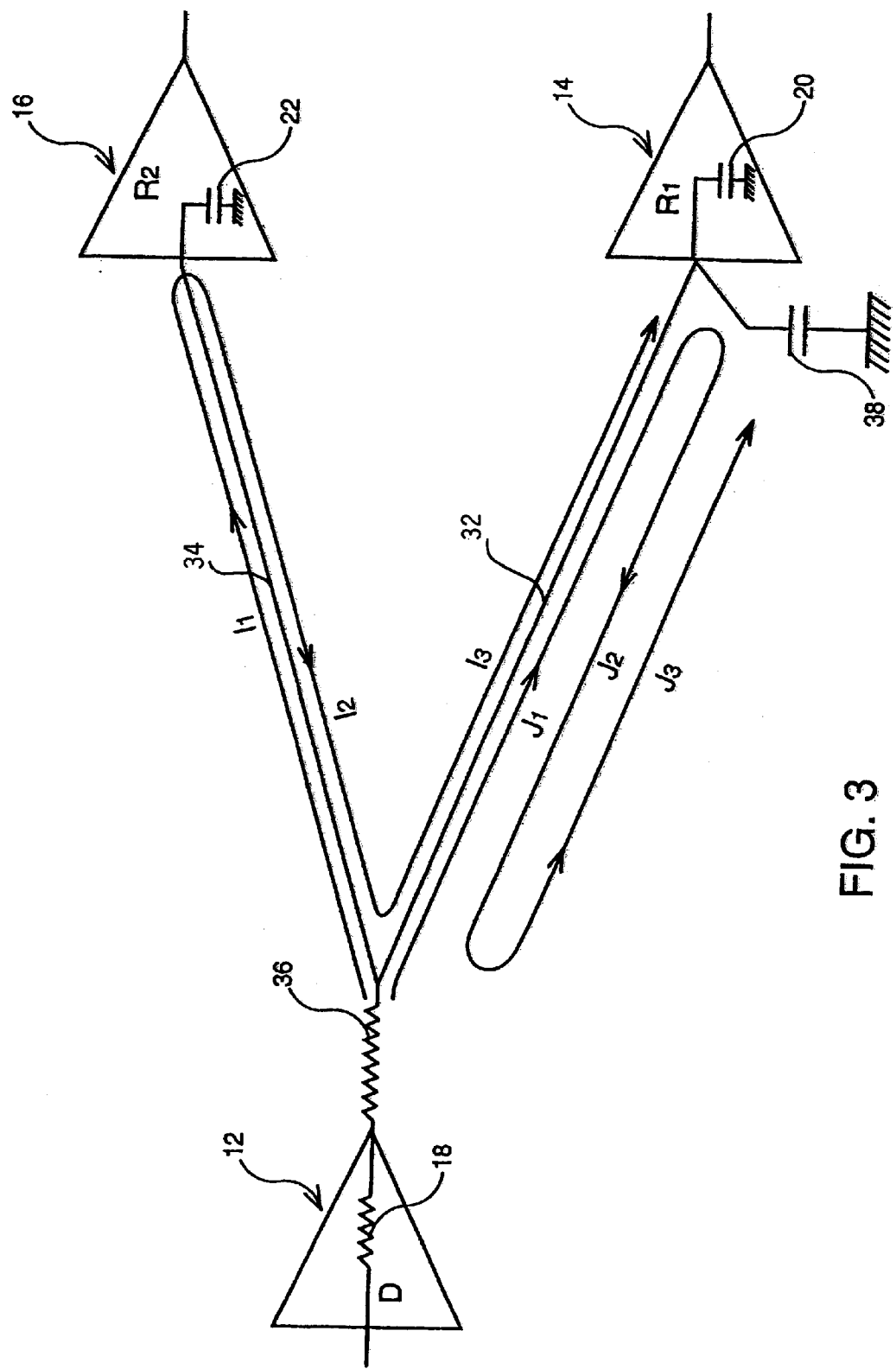
FIG. 3 represents schematically the driver and the two receivers of the card illustrated in FIG. 2 and the effects of the reflections which are canceled for each one of the two receivers.

As schematically represented in FIG. 3, the effects of the reflections received in receiver 14 are as follows. First, the incident signal $I_1$ transmitted from driver 12 to receiver 16 is a portion $\rho_0$ of the source signal X transmitted from driver 12, that is $$I_1 = \rho_0 \cdot X$$

with $\rho_0$ being a coefficient which depends principally on resistance 36 (in the considered example, we can admit that $\rho_0 = 2/3$).

A portion $\rho_{R2}$ of the incident signal received by receiver 16 is reflected by receiver 16 and the signal resulting from the reflection is therefore:

$$I_2 = -\rho_{R2} \cdot I_1$$

$$I_2 = -\rho_{R2} \cdot \rho_0 \cdot X$$

with $\rho_{R2}$ being the reflection coefficient of receiver 16, and the signal being inverted (sign −) due to a reflection.

When reaching the node between resistance 36, transmission medium 32 and transmission 34, a portion $\rho_{D2}$ Of the signal $I_2$ is transmitted to receiver 14 over transmission medium 32 resulting in a signal $I_3$ $$I_3 = \rho_{D2} \cdot I_2$$

$$I_3 = -\rho_{D2} \cdot \rho_{R2} \cdot \rho_0 \cdot X \quad (1)$$

The value of transmission coefficient $\rho_{D2}$ is then:

$$\rho_{D2} = \frac{2R}{2R + Z_0}$$

With $Z_0$ being the characteristic impedance of the transmission media and R being the sum of the value $R_{ADD}$ of resistance 36 and the value of resistance $R_{out}$ of driver 12.

Another signal is due to the direct reflection by receiver 14 of the incident signal $J_1$ transmitted from driver 12 to receiver 14.

As already explained, this incident signal is a portion $\rho_0$ of the source signal X transmitted from driver 12, that is $$J_1 = \rho_0 \cdot X$$

A portion $\rho_{R1}$ of the incident signal received by receiver 14 is reflected by receiver 16 and the signal resulting from the reflection is therefore:

$$J_2 = -\rho_{R1} \cdot J_1$$

$$J_2 = -\rho_{R2} \cdot \rho_0 \cdot X$$

with $\rho_{R2}$ being the reflection coefficient of receiver 14 and the signal being inverted (sign −) due to the reflection.

When reaching the node between resistance 36, transmission medium 32 and transmission medium 34, a portion $\rho_D$ of the signal is again reflected by the node toward receiver 14 resulting in a signal $$J_3 = -\rho_D \cdot J_2$$

$$J_3 = +\rho_D \cdot \rho_{R2} \cdot \rho_0 \cdot X \quad (2)$$

the value of the reflection coefficient $\rho_D$ is then $$\rho_D = \frac{Z_0}{2R + Z_0}$$

with $Z_0$ being the characteristic impedance of the transmission media and R being the sum of the value $R_{OUT}$, the driver resistance and the value $R_{ADD}$ of resistance 36.

The object of the invention being that there is no perturbation due to reflections, it is necessary that the following conditions are met:

1. the signals $I_3$ and $J_3$ having different signs, have the same absolute value;
2. the signals $I_3$ and $J_3$ arrive at the same time in receiver 14.

The first condition is achieved if $$|I_3| = |J_3|$$

$$\rho_{D2} \cdot \rho_{R2} \cdot \rho_0 \cdot X = \rho_D \cdot \rho_{R1} \cdot \rho_0 \cdot X \quad (3)$$

$$\rho_{D2} \cdot \rho_{R2} = \rho_D \cdot \rho_{R1} \quad (4)$$

In order to have identical reflection coefficients in both receivers, a capacitance 38 is added in parallel at the input of receiver 14 so that the combination of internal capacitance 20 and added capacitance 38 is equal to the internal capacitance 22 of receiver 16, assuming that internal capacitance 22 is greater than internal capacitance 20. It must be noted that a capacitance would be added to the input of receiver 16 if the internal capacitance 20 of receiver 14 was greater than internal capacitance 22 of receiver 16.

If $\rho_{R1} = \rho_{R2}$, the above equation (4) becomes $$\rho_{D2} = \rho_D \quad (5)$$

$$\frac{2R}{2R + Z_0} = \frac{Z_0}{2R + Z_0} \cdot 2R = Z_0 \quad (6)$$

-continued $$R = R_{OUT} + R_{ADD} = \frac{Z_0}{2} \quad (7)$$

Accordingly, a resistance must be added at the output of driver 12, the value of which is $$R_{ADD} = \frac{Z_n}{2} - R_{OUT}$$

It is clear that, when the two above conditions are met, resulting in having an identical length of both transmission media and an identical receiver capacitance for both receivers, the assembly is symmetrical, meaning that the effects of the reflections received by receiver 16 are also canceled.

The second condition is achieved if the lengths of the two transmission media are identical. Assuming that the transmission medium length from driver 12 to receiver 14 is shorter than the transmission medium length from driver 12 to receiver 16, an extra length of transmission medium 40 is added to net 32 so that the length of the transmission medium from driver 12 to receiver 14 is equal to the length of the transmission medium from driver 12 to receiver 16. Note that this condition could also be achieved by introducing delay means in the shorter transmission medium. In all cases, the delay means (such an extra net) must have a characteristic empedance of value $Z_0$.

The above scheme may be generalized to a card including more than two receivers. Assuming that there are n receivers (generally, n is less than 5), the first condition is achieved when the absolute value of signal $J_3$ received by receiver R1 is equal to the absolute value of the algebraic sum of all signals reflected by all other receivers R2, R3 . . . Rn. It would be easy to demonstrate that the equation (6) becomes in such a case $$\frac{nR}{nR+Z_0} = \frac{Z_0}{nR+Z_0} \quad (6')$$
$$nR = Z_0$$

$$R = R_{OUT} + R_{ADD} = \frac{Z_0}{n} \quad (7')$$

Accordingly, a resistance must be added at the output of driver 12, the value of which is $$R_{ADD} = \frac{Z_0}{n} - R_{OUT}$$

and it is necessary to add a capacitance at the input of n−1 receivers in order to adjust the total capacitance of each receiver so that all receivers have the same capacitance. Note that the driver has an output resistance $R_{out}$ which is as low as possible such that it is less than $$\frac{Z_0}{n}.$$

The second condition is easily achieved by adding an extra length of transmission medium to n−1 transmission media in order to reach for each of them the length of the longest transmission medium amongst all the transmission media.

In general way, the method to be used for cancelling the effects of reflections on a card including a driver connected to a plurality of n receivers consists in:

1. determining which transmission medium from the driver to one of the receivers has the longest length $L_{max}$ and adding an extra length of transmission medium to each other transmission medium so that the resulting transmission medium length from the driver to the considered receiver has a length which is equal to the length of the longest transmission medium. It must be noted that the same result could be obtained by introducing delay mans in each transmission medium except the longest one so that the propagating time is the same for each transmission medium;

2. determining which receiver has the largest internal capacitance $C_{max}$ and put a capacitance connected to the ground at the input of each one of the other receivers so that the total capacitance for each one is equal to $C_{max}$;

3. adding a resistance at the output of the driver, the value of which is $$R_{ADD} = \frac{Z_0}{n} - R_{OUT}$$

wherein $Z_0$ is the characteristic impedance of the transmission media and $R_{OUT}$ is the output resistance of the driver.

What is claimed is:

1. A signal transmission system including a driver and a plurality of n receivers wherein signals are sent according to a multipoint topology from said driver to said receivers, each receiver having an internal capacitance and sending back reflection signals to said driver each time a signal is transmitted thereto by said driver;

characterized in that:

said system comprises circuit means causing the signal resulting from the sequential reflections from a given receiver and then from said driver to have the same magnitude but the reverse sign as the sum of all signals received in said given receiver resulting from the reflections from all other receivers, and the transmission medium linking said driver to each receiver comprises delay means enabling the propagating time of a signal sent from said driver to a receiver to be identical for each receiver, whereby the algebraic sum of all reflection signals arriving in said given receiver at the same time is equal to zero.

2. A system according to claim 1, wherein all the transmission media from said driver to said receivers and said delay means have a characteristic impedance value $Z_0$.

3. A system according to claim 2, wherein said delay means is an extra length of transmission medium, the length of which is defined so that the total length of the transmission medium when said extra length of transmission medium has been added is equal to the length of the transmission medium having the longest length amongst all transmission media from said driver to said receivers.

4. A system according to claim 1, wherein said circuit means comprise an added capacitance connected between the input of each receiver and ground when said receiver is not the receiver having the largest internal capacitance so that the total capacitance of each receiver composed of its internal capacitance and said added capacitance is substantially the same as said largest internal capacitance.

5. A system according to claim 4, wherein said circuit means comprise an added resistance inserted at the output of said driver, the value of said added resistance being equal to $$R_{ADD} = \frac{Z_0}{n} - R_{OUT}$$

wherein $Z_0$ is said characteristic impedance value of the transmission media and $R_{OUT}$ is the value of the internal resistance of said driver.

6. A system according to claim 5, wherein the value of $Z_0$ is equal to 50 ohms.

7. A system according to claim 3, wherein said circuit means comprise an added capacitance connected between the input of each receiver and ground when said receiver is not the receiver having the largest internal capacitance so that the total capacitance of each receiver composed of its internal capacitance and said added capacitance is substantially the same as said largest internal capacitance.

8. A system according to claim 5, wherein said circuit means comprise an added resistance inserted at the output of said driver, the value of said added resistance being equal to $$R_{ADD} = \frac{Z_0}{n} - R_{OUT}$$

wherein $Z_0$ is said characteristic impedance value of the transmission media and $R_{OUT}$ is the value of the internal resistance of said driver.

9. A system according to claim 7, wherein said circuit means comprise an added resistance inserted at the output of said driver, the value of said added resistance being equal to $$R_{ADD} = \frac{Z_0}{n} - R_{OUT}$$

wherein $Z_0$ is said characteristic impedance value of the transmission media and $R_{OUT}$ is the value of the internal resistance of said driver.

* * * * *